(12) United States Patent  
Dinh et al.

(10) Patent No.: US 7,126,059 B2
(45) Date of Patent: Oct. 24, 2006

(54) RECESSED FLOOR BOX COVER ASSEMBLY

(75) Inventors: Cong Thanh Dinh, Collierville, TN (US); Kevin Warren, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/353,650

(22) Filed: Feb. 14, 2006

(65) Prior Publication Data

US 2006/0180332 A1  Aug. 17, 2006

Related U.S. Application Data

(60) Provisional application No. 60/653,336, filed on Feb. 16, 2005.

(51) Int. Cl.
*H02G 3/14* (2006.01)
(52) U.S. Cl. .......................... 174/66; 174/67; 220/241
(58) Field of Classification Search .................. 174/66, 174/67; 220/241, 242; D8/353; D13/177; 312/328; 33/528
See application file for complete search history.

(56) References Cited

U.S. PATENT DOCUMENTS

| | | | |
|---|---|---|---|
| 995,203 A | 6/1911 | Thomas et al. | |
| 4,385,504 A | 5/1983 | Perrone et al. | |
| 4,851,612 A * | 7/1989 | Peckham ..................... | 174/67 |
| 4,967,041 A | 10/1990 | Bowman | |
| 5,167,047 A | 12/1992 | Plumley | |
| 5,455,388 A | 10/1995 | Pratt | |
| 5,525,755 A | 6/1996 | Christensen | |
| 5,686,700 A | 11/1997 | Carpinella | |
| 5,796,037 A | 8/1998 | Young et al. | |
| 6,103,974 A * | 8/2000 | Erdfarb ....................... | 174/66 |
| 6,179,634 B1 | 1/2001 | Hull et al. | |
| 6,274,809 B1 | 8/2001 | Pudims et al. | |
| 6,310,291 B1 * | 10/2001 | Clough ........................ | 174/67 |
| 6,653,566 B1 * | 11/2003 | Petak et al. ................... | 174/66 |
| 6,664,471 B1 * | 12/2003 | Howe, Jr. ..................... | 174/66 |
| 6,686,540 B1 | 2/2004 | Compagnone, Jr. | |

* cited by examiner

*Primary Examiner*—Dhiru R. Patel
(74) *Attorney, Agent, or Firm*—Hoffmann & Baron, LLP

(57) ABSTRACT

The present invention provides a recessed floor box assembly including a cover and floor box housing designed to be adaptable to the cover. The cover is designed to be removable and repositionable for covering the open face of the box housing in either the closed or open positions. The cover can be selectively positioned to open or close an access opening into the box housing while still retaining a covering on the box housing.

10 Claims, 4 Drawing Sheets

RECESSED FLOOR BOX COVER ASSEMBLY

CROSS REFERENCE TO RELATED APPLICATION

This application claims priority to U.S. Provisional Application No. 60/653,336, filed Feb. 16, 2005, which is incorporated herewith.

FIELD OF THE INVENTION

The present invention relates generally to recessed floor boxes which house power and communication wires or cables for termination. More specifically, the present invention relates to a recessed floor box assembly with a removable and reinsertable rotate snap cover for covering the box while either in service or while not in service.

BACKGROUND OF THE INVENTION

It is well known to run electrical wires and telecommunications wires underneath the surface of a floor. These cables and electrical systems may be placed under the floor surface so as to be more efficient in supplying power and data/telecommunication signals in commercial buildings. The electrical cables or wires beneath the floor may be accessed through a hole in the surface of the floor. In order to provide convenient access to the wires or cables as well as the termination devices which terminate the wires, a floor box is typically placed in the hole through the floor.

The cables are typically housed in ducts that are placed beneath the floor surface. These ducts are typically made of a metal, i.e. steel, iron, aluminum, etc., for structural rigidity to support the weight of the floor on top of the ducts. After the ducts are properly positioned in the floor, concrete then covers the ducts to create the actual floor surface. The thickness of the concrete floor, and the depth at which the ducts must be buried in the floor, are usually regulated by local building codes. The floor boxes may be integrated into the ducts before the concrete floor is poured. However, in most instances, the concrete floor is poured over the ducts and then holes are drilled into the floor to insert the floor boxes that are connected to the duct.

With many electrical boxes, especially those which are used to house termination devices positioned within a floor, it is desirable to construct the box to be water resistant, so as to protect the components housed therein. Undesirable accumulation of water within the box can be detrimental to such components. Various electrical codes and standards such as those promulgated by Underwriters Laboratories (UL) require the floor boxes to have a certain degree of water resistance, i.e., resistance to entry of water over a period of time.

The art has seen a wide variety of box constructions which are designed to prevent the accumulation of water within the box. Many of these designs employ complicated gaskets which are interposed between the box and the cover of the box so as to prevent water from entering therebetween. While these gaskets do adequately prevent water entry, the gasket structures rely on precise assembly of the components, including the gaskets.

Many of these electrical floor boxes have access covers or panels that can be opened to provide access to the interior of the box for installing outlets for making connections to the wires and cables. The covers of the floor boxes are always opened when in use. Thus, the cover cannot be closed or put back on to the box when the wires or cables are connected into the interior of the box.

Alternatively, some floor box covers may have a small door thereon. The door allows the cover to be in a closed position, while the wires can exit through the door. However, the door itself protrudes above the cover which can break off and may also create a tripping hazard.

Further it is desirable to provide a cover assembly having a removable rotate snap cover for covering the box whether in closed or open positions. It is also desirable to provide a cover assembly having a removable rotate snap cover that is operable to selectively open or close an access opening into the box with no protruding parts that may break off or create a tripping hazard.

SUMMARY OF THE INVENTION

The present invention discloses a floor box cover assembly having a floor box housing including a bottom surface, an upstanding wall surrounding the surface terminating in an open face, and a tab projecting into an interior of the housing having a surface substantially flush with the open face. The assembly also includes a removable, repositionable cover including a notched-out portion adapted to align with the tab of the box housing such that when the cover is placed on top of the box housing, the notched out portion aligns with the tab to completely enclose the open face thereby preventing access therethrough. The cover is also repositionable for placement on top of the box housing such that the notched-out portion no longer aligns with the tab thereby providing an opening permitting wires to pass through.

DETAILED DESCRIPTION OF THE PREFERRED EMBODIMENTS

The present invention provides a recessed floor box cover assembly, more particularly a recessed floor box assembly which employs a lid or cover for covering the box while either in service or while not in service. The cover is removable and repositionable so as to selectively open or close an access opening into the box. The floor box cover assembly of the present invention is water resistant, thereby maintaining the covered electrical connections dry and free from any contamination.

Figure 1:
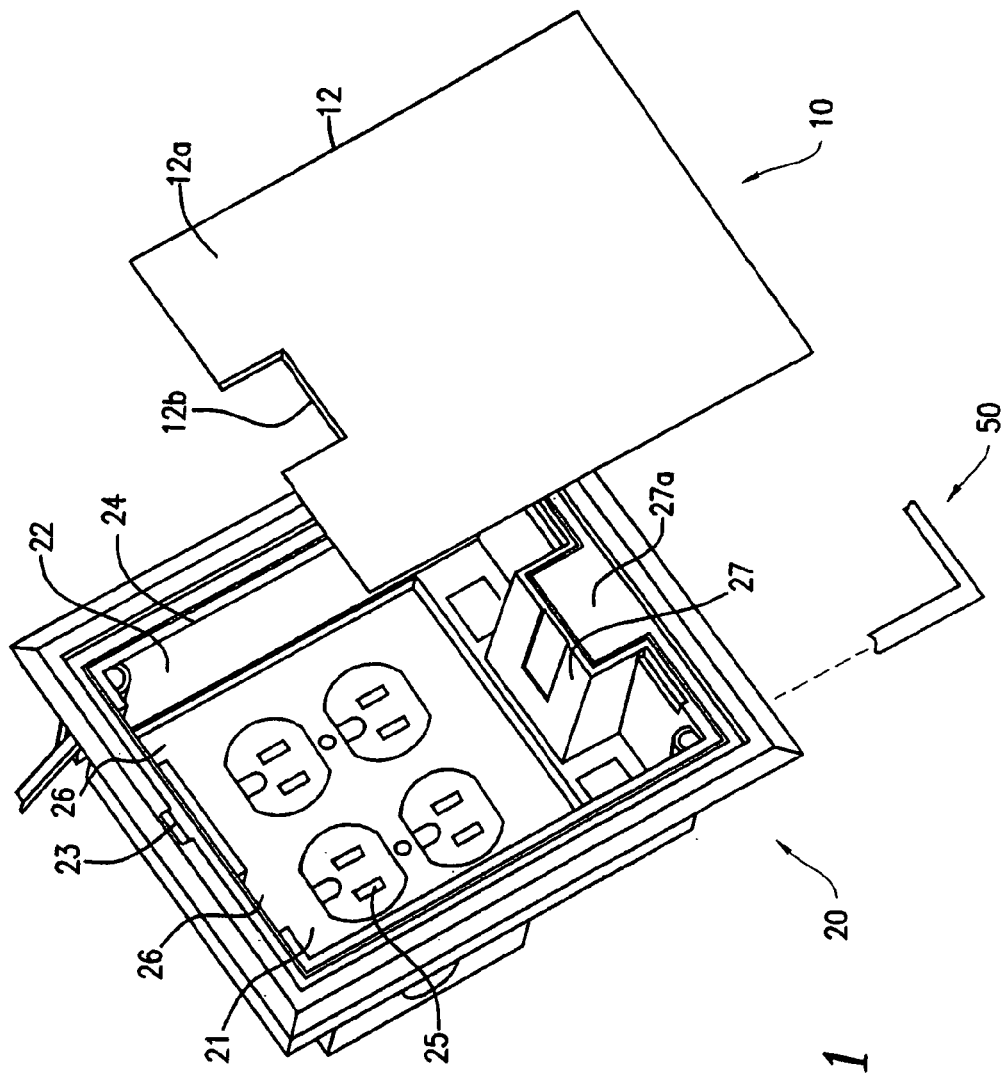
FIG. 1 is a perspective view of the floor box assembly with components, floor box and the cover according to the present invention.

Referring to the FIG. 1, there is shown a perspective view of the floor box cover assembly 10 of the present invention. The floor box cover assembly 10 is used in combination with a floor box housing 20 to provide termination of power, data, and communication wires therethrough.

The embodiment of FIG. 1 shows a generally rectangular floor box housing 20 including a bottom flat surface 21 and an upstanding wall 22 surrounding all four sides of the surface 21 terminating in a generally rectangular open face 24. This generally rectangular open face 24 defined by the floor box housing 20 permits the insertion of both power and communication/data receptacles therein for connection to data and electrical wires. As shown by way of example, electrical receptacles 25 are located on the bottom surface 21 of the housing 20 and the opening 24 permits access to these receptacles 25. A slot 23 is provided at a top edge of one side of the upstanding wall 22 as shown in FIG. 1 to aid in the removal of cover 12 from housing 20.

In this embodiment, the floor box housing includes detents 26 at top edge of the upstanding wall 22 that are used in conjunction with the cover assembly 10 to detach and reattach the cover to the floor box housing 20 as will be described in greater detail below. Additionally, as shown in FIG. 1, the floor box housing 20 also includes a protrusion or a tab 27 which projects into the interior of the housing 20. The tab 27 has a top surface 27a which is flush with the open face 24. The tab 27 is preferably positioned in the middle of one side of one wall 22 and is designed to align with the cover assembly 10 as will be described in greater detail below.

Floor box housing 20 may be integrally or unitarily formed of a suitable plastic material such as polyvinylchloride (PVC) and it may be formed via a wide variety of known plastic forming techniques. Further, floor box housing 20 may be formed of various metallic materials as known in the art.

It is within the contemplation of the invention that the floor box housing 20 can be of any of a variety of shapes, e.g., round, square, rectangular, octagon, oval or some other shape as known in the art, and designed to be adaptable to the floor box cover assemblies described herein. For sake of brevity, only the rectangular version is described in detail.

Figure 2:
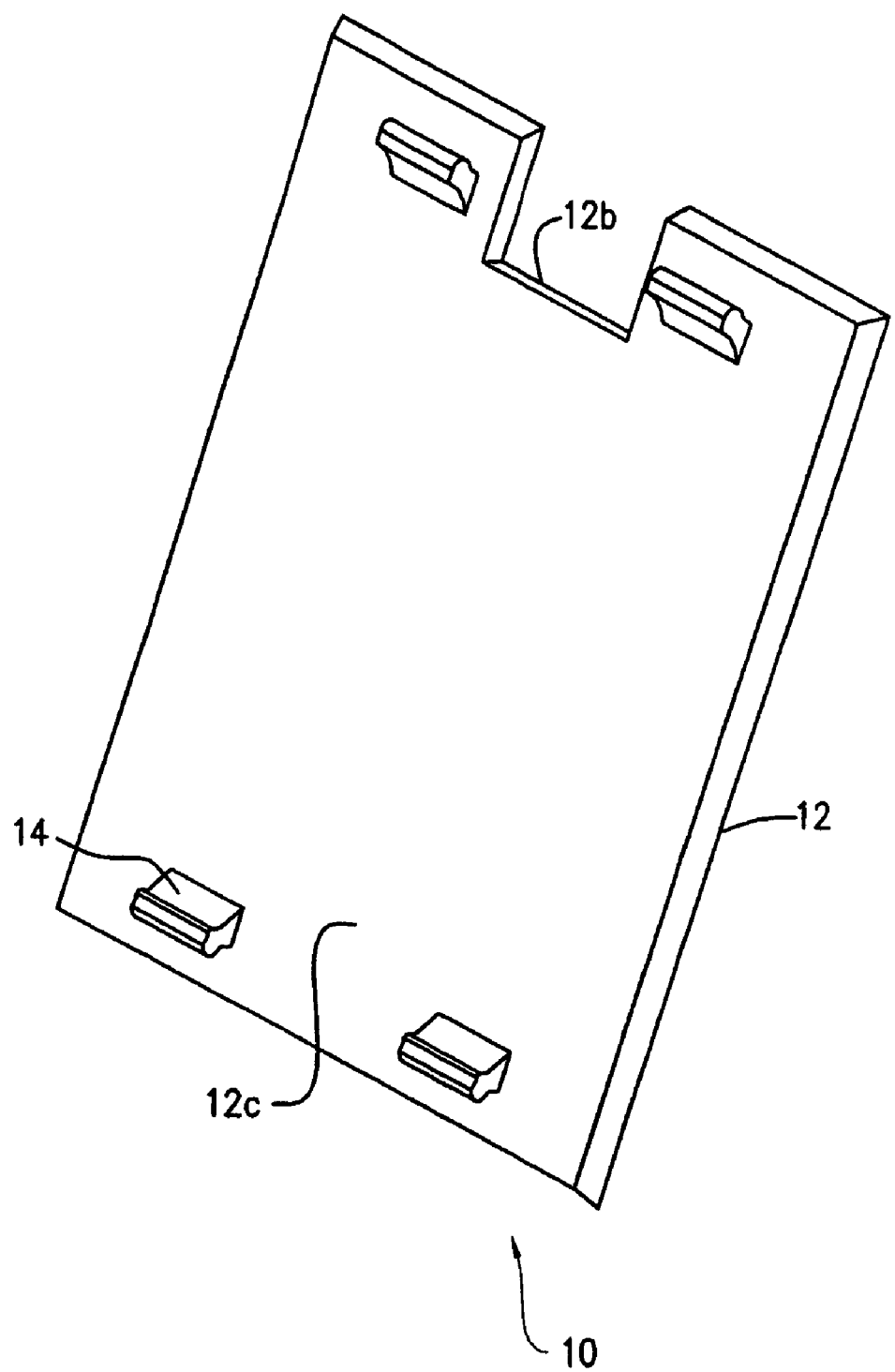
FIG. 2 is a perspective view of the underneath surface of the cover according to the present invention.

Referring to both FIGS. 1 and 2 there is shown one version of a floor box cover assembly 10 of the present invention. The cover assembly 10 can preferably be formed of any metallic or plastic material known in the art. Cover assembly 10 includes a planar member or cover 12 having a top surface 12a as shown. The floor box cover assembly 10 in this embodiment is generally rectangular in shape so as to fit into the open face 24 of the housing 20. The cover includes a notched out portion 12b preferably positioned in the middle of one side of the cover 12 to align with the tab 27 of the floor box housing 20.

Now referring to FIG. 2, there is shown an underneath surface 12c of the cover 12. The underside of cover 12 includes a pair of latches 14 located at opposed edges thereof. The latches 14 are designed for resilient snap engagement with the detents 26 at the top edge of the upstanding wall 22 of the floor box housing 20, thereby attaching the cover assembly 10 to the floor box housing 20. In order to detach the cover 12 from the floor box housing 20, a finger or a tool can be inserted into slot 23 of the floor box housing 20 which resiliently forces the latches 14 to snap out of the detents 26, thereby detaching the cover 12 from the box housing 20.

Figure 3:
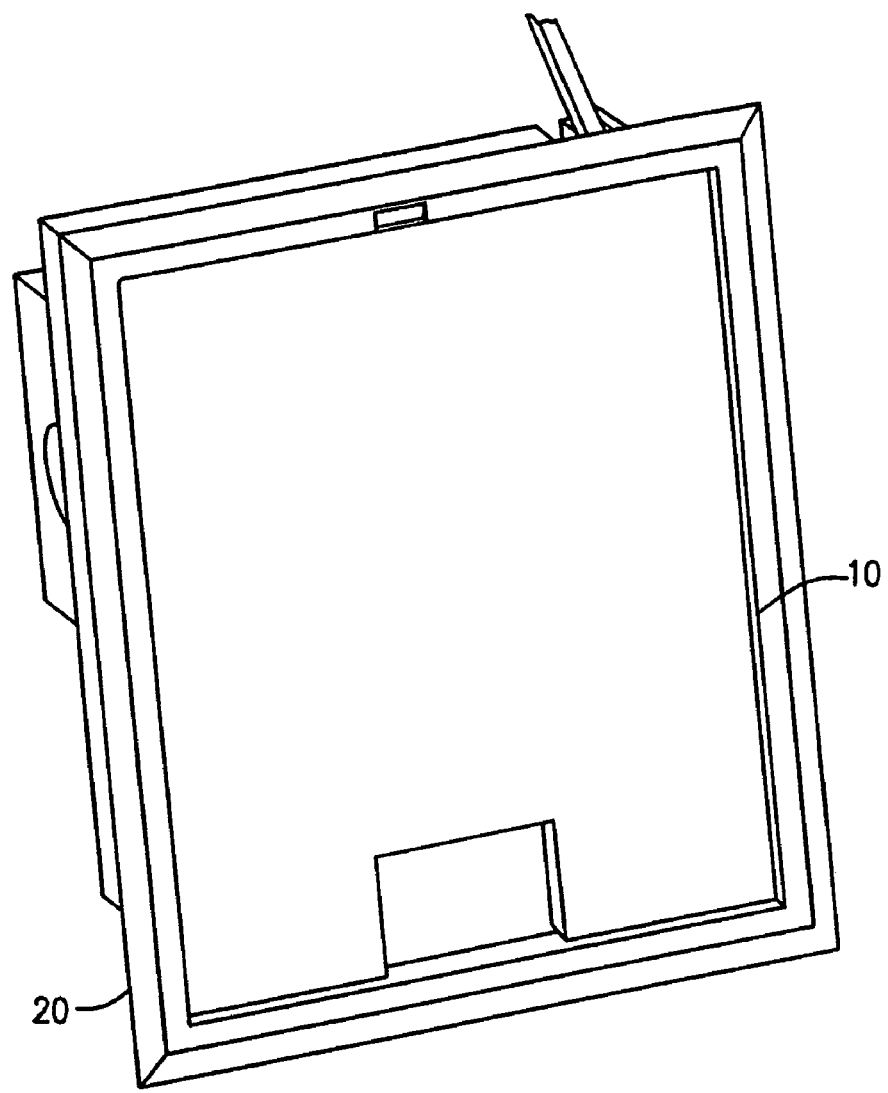
FIG. 3 is a perspective view of the floor box assembly in a "not in service" or closed position according to the present invention.

Referring to FIG. 3, there is shown a perspective view of the cover assembly 10 and the box housing 20 assembled together in a "not in service" or "closed" position. In this position, cover assembly 10 is arranged so that notch 12b is positioned over tab 27. In other words, in this position, the open face 24 of floor box housing 20 is fully covered and there is no access or opening provided for cabling to pass through or into the floor box.

Figure 4:
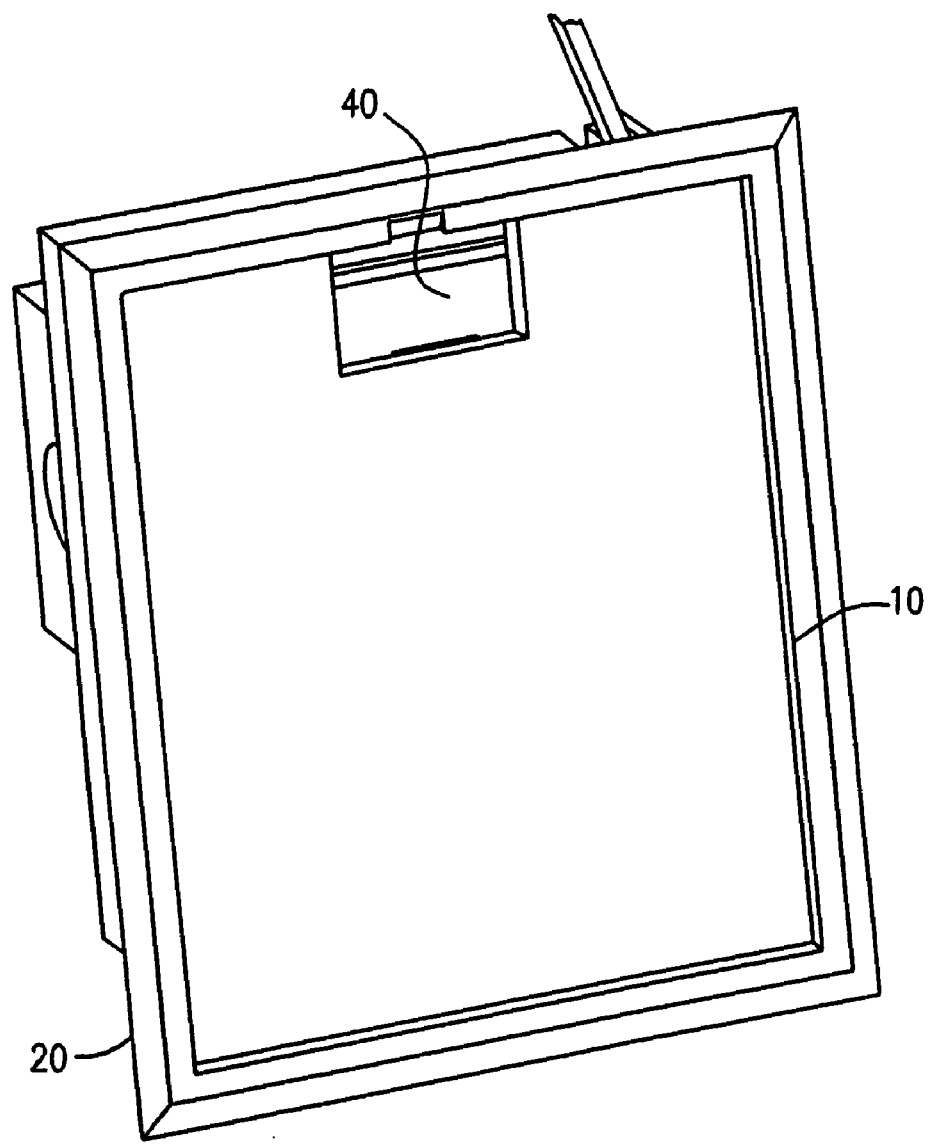
FIG. 4 is a perspective view of the floor box assembly in an "in service" or open position according to the present invention.

Referring to FIG. 4, there is shown a perspective view of the cover assembly 10 and the box housing 20 assembled together in an "in service" position or "open" position. In this position, box housing 20 is covered with the cover assembly 10 after having been removed, rotated, and replaced. In this position, the notch 12b of the cover 12 is not aligned with tab 27 of the floor box, thereby creating an opening 40 therethrough for entry of wires or cables.

The floor box cover assembly 10 of the present invention provides a means of covering the box housing 20 while either in service, or while not in service. Referring back to FIG. 3, the cover assembly 10 is assembled with the box housing 20 in a "not in service" position. In this position, the cover 12 is placed on top of the box housing 20 with the latches 14 facing into the open face 24 of the box. The notch 12b in the cover 12 is aligned with the tab 27 of the box housing 20 and with a little force, latches 14 snap right into the detents 26 of the box housing 20, thereby attaching the cover 12 onto the box housing 20 and completely covering the open face 24. However, when service is required, i.e., cabling needs to enter the box housing 20, the cover 12 is removed from the box housing 12. This is achieved by a finger or a tool inserted into the slot 23 of the box housing 20 forcing the latches 14 to snap out of the detents 26, thereby detaching the cover 12 from the box housing 20. The cover 12 is then removed and repositioned, (preferably after being rotated about 180 degrees for rectangular boxes, possibly less for other box configurations) and then snapped back in place by forcing the latches 14 to snap into the detents 26 of the box, thereby attaching the cover 12 back onto the box housing 20. However, in this new position, the notch 12b of the cover 12 is no longer lined up with the tab 27 of the box housing 20 as shown in FIG. 4. The notch 12b of the cover 12 now provides the opening 40 for the cables or wires to enter the box housing 20. Therefore, this assembly of the cover assembly 10 and the box housing 20 is known as the "in service" position. No matter which position is selected, there is no cover or door on the floor box cover extending above the floor surface that might create a tripping hazard.

Although the cover assembly 10 of the present invention as shown and described is rectangular in shape, it is understood that the cover assembly may include other shapes such as square, round, oval, octagon or various other shapes known in the art. Additionally, as mentioned above the floor box housing 20 would then be designed to adapt to the shape of the cover assembly 10. So, if the shape of cover assembly 10 is square, then the box housing 20 can be designed in such a way that the cover 12 need only be rotated preferably 90 degrees as opposed to 180 degrees which would be the case if the cover assembly 10 is rectangular in shape. Additionally, if the cover assembly 10 is round, then the box 20 is designed such that the cover frame 12 need only be rotated preferably about 120 degrees. Other amounts would equally suffice.

In an alternate preferred embodiment, a gasket 50 shown in FIG. 1, may be placed between the box housing 20 and the cover assembly 10 to prevent water or any other liquid from entering past the open face 24 to protect the electrical receptacles 25 on the bottom surface 21 of the box housing 20. Cover assembly 10 may include a groove (not shown) disposed in the undersurface thereof. Gasket 50 may be sized to fit within the groove and be held in place by friction fit or adhesive or some other means. Alternatively, gasket 50 may be placed as shown in FIG. 1 along the periphery of open face 24. When cover 10 is in the closed position, i.e., the cover assembly 10 and the box housing 20 are assembled together, gasket 50 is engaged and a waterproof seal is created between the cover 12 and the box housing 20. Additionally, a ridge (not shown) may preferably be placed around the open face 24 to help compress the gasket 50 even further to create an even greater liquid-tight seal.

While the particular embodiments of the present invention has been shown and described, it will be obvious to those skilled in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A floor box assembly comprising:
 a floor box housing including a bottom surface, an upstanding wall surrounding the bottom surface terminating in an open face, and a tab projecting into an interior of the housing having a surface substantially flush with said open face;
 a removable, repositionable cover including a notched-out portion adapted to align with the tab of the box housing such that when the cover is placed on top of the box housing such that the notched out portion aligns with the tab to completely enclose the open face thereby preventing access through;
 said cover being repositionable for placement on top of the box housing such that the notched-out portion no longer aligns with the tab thereby providing an opening to allow access of wires through.

2. The assembly of claim 1 wherein said box housing includes detents at a top edge of the upstanding wall.

3. The assembly of claim 2 wherein said cover includes latches on its underneath surface wherein said latches are designed for resilient snap engagement with said detents, thereby attaching the cover onto the box housing.

4. The assembly of claim 3 wherein said box housing includes a slot positioned on the top edge of the upstanding wall.

5. The assembly of claim 4 wherein an insertion into the slot forces the latches to snap out of the detents, thereby detaching the cover from the box housing.

6. The assembly of claim 1 wherein said cover can be placed on top of the box housing in both open and closed positions.

7. The assembly of claim 1 wherein said floor box housing is designed to be adaptable to the cover.

8. The assembly of claim 1 wherein said cover is rotated at an angle in the range of between 1° and 180°.

9. The assembly of claim 8 wherein said cover and the floor box housing is substantially rectangular in shape and the cover is rotated 180°.

10. The assembly of claim 1 further includes a gasket placed between the box housing and the cover to create a liquid-tight seal.

* * * * *